United States Patent
Zhu et al.

(10) Patent No.: US 9,680,543 B2
(45) Date of Patent: *Jun. 13, 2017

(54) BEAMFORMING USING BASE AND DIFFERENTIAL CODEBOOKS

(71) Applicant: Intel Corporation, Santa Clara, CA (US)

(72) Inventors: Yuan Zhu, Beijing (CN); Qinghua Li, San Ramon, CA (US); Xintian E. Lin, Mountain View, CA (US); Huaning Niu, Milpitas, CA (US); Alexei Davydov, Nizhny Novgorod (RU)

(73) Assignee: Intel Corporation, Santa Clara, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/203,606

(22) Filed: Jul. 6, 2016

(65) Prior Publication Data

US 2016/0315678 A1 Oct. 27, 2016

Related U.S. Application Data

(63) Continuation of application No. 14/593,957, filed on Jan. 9, 2015, now Pat. No. 9,419,694, which is a (Continued)

(51) Int. Cl.
*H04L 12/16* (2006.01)
*H04B 7/0456* (2017.01)
(Continued)

(52) U.S. Cl.
CPC ......... *H04B 7/0456* (2013.01); *H04B 7/0617* (2013.01); *H04B 7/0619* (2013.01);
(Continued)

(58) Field of Classification Search
CPC ....................................................... H04B 7/04
(Continued)

(56) References Cited

U.S. PATENT DOCUMENTS 6,927,728 B2  8/2005  Vook et al.
7,266,157 B2  9/2007  Sim et al.
(Continued)

FOREIGN PATENT DOCUMENTS

EP     1742428 A1    1/2007
JP     2005-532767   10/2005
(Continued)

OTHER PUBLICATIONS

International Search Report mailed Feb. 24, 2011 from International Application No. PCT/US2010/040887.
International Preliminary Report on Patentability mailed Jan. 19, 2012 from International Application No. PCT/US2010/040887.
Office Action mailed Jul. 12, 2013 from Korean Patent Application No. 10-2012-7003254.
(Continued)

*Primary Examiner* — Iqbal Zaidi
(74) *Attorney, Agent, or Firm* — Schwabe, Williamson & Wyatt, P.C.

(57) ABSTRACT

Embodiments of methods and apparatus for determining and/or quantizing a beamforming matrix are disclosed. In some embodiments, the determining and/or quantizing of the beamforming matrix may include the use of a base codebook and a differential codebook. Additional variants and embodiments are also disclosed.

23 Claims, 4 Drawing Sheets

Related U.S. Application Data continuation of application No. 13/652,061, filed on Oct. 15, 2012, now Pat. No. 9,042,322, which is a continuation of application No. 12/639,640, filed on Dec. 16, 2009, now Pat. No. 8,315,204.

(60) Provisional application No. 61/223,360, filed on Jul. 6, 2009.

(51) Int. Cl.

| | | |
|---|---|---|
| *H04L 12/66* | (2006.01) | |
| *H04W 52/10* | (2009.01) | |
| *H04B 7/06* | (2006.01) | |
| *H04W 72/04* | (2009.01) | |
| *H04W 16/28* | (2009.01) | |
| *H04W 48/16* | (2009.01) | |
| *H04W 52/14* | (2009.01) | |
| *H04W 72/00* | (2009.01) | |
| *H04W 84/04* | (2009.01) | |

(52) U.S. Cl.
CPC ........... *H04B 7/0641* (2013.01); *H04L 12/66* (2013.01); *H04W 52/10* (2013.01); *H04W 72/0413* (2013.01); *H04W 16/28* (2013.01); *H04W 48/16* (2013.01); *H04W 52/146* (2013.01); *H04W 72/00* (2013.01); *H04W 84/045* (2013.01)

(58) Field of Classification Search
USPC ................... 370/26–269, 328–339; 375/260; 455/446
See application file for complete search history.

(56) References Cited

U.S. PATENT DOCUMENTS

| | | | |
|---|---|---|---|
| 7,362,822 | B2 | 4/2008 | Li et al. |
| 7,885,348 | B2 | 2/2011 | Li et al. |
| 8,019,023 | B2 * | 9/2011 | Song ..................... H04L 1/0047 375/340 |
| 8,149,791 | B2 | 4/2012 | Li et al. |
| 2006/0241919 | A1 | 10/2006 | Kobayashi |
| 2007/0195974 | A1 | 8/2007 | Li et al. |
| 2009/0046807 | A1 | 2/2009 | Xia et al. |
| 2009/0086842 | A1 | 4/2009 | Shi et al. |

FOREIGN PATENT DOCUMENTS

| | | |
|---|---|---|
| JP | 2005532767 A | 10/2005 |
| JP | 2006522505 A | 9/2006 |
| TW | 201132029 | 9/2011 |
| WO | 2007/070313 A2 | 6/2007 |
| WO | 2008-082344 A1 | 7/2008 |
| WO | 2008/155707 A1 | 12/2008 |
| WO | 2008155707 | 12/2008 |
| WO | 2009/075662 A1 | 6/2009 |

OTHER PUBLICATIONS

Office Action issued Dec. 11, 2013 from Korean Divisional Patent Application No. 10-2013-7024181.
Office Action issued Jan. 21, 2014 from Chinese Patent Application No. 201080034784.X.
Office Action issued Nov. 26, 2013 from Japanese Application No. 2012-519617.
Final Rejection issued May 20, 2014 from Korean Divisional Patent Application No. 10-2013-7024181.
Office Action received in Japanese Application No. 2012-519617, issued on May 21, 2013.
Office Action issued Feb. 24, 2015 from Taiwan Patent Application No. 099122025.
Office Action issued Apr. 7, 2015 from Japanese Divisional Application No. 2014-089955.
Office Action issued Sep. 1, 2015 from Japanese Divisional Application No. 2014-089955, 2 pages.
Office Action and Search Report issued Aug. 22, 2016 from Taiwan Divisional Application No. 104135619, 11 pages.
"IEEE Standard for Local and metropolitan area networks, Part 16: Air Interface for Broadband Wireless AccessSystems," "IEEE Computer Society and the IEEE Microwave Theory and Techniques Society, IEEE Sted 802.16 2009,May 29, 2009, New York, New York, pp. 2082".
Li et al., "Differential feedback for IEEE 802.16m MIMO Schemes," IEEE C802.16m-09/0058r4, Jan. 5, 2009, pp. 1-5.
Roh et al, "Channel Feedback Quantization Methods for MISO and MIMO Systems", Personal, Indoor and Mobile Radio Communications, 2004. PIMRC 2004. 15th IEEE International Symposium on, Sep. 2004, vol. 2.
LTE "Evolved Universal Terrestrial Radio Access (E-UTRA); Physical layer procedures"; 3GPP TS 36.213, version 8.7.0 Release 8, Jun. 8, 2009, 79 pages.
Li et al., "Compact Feedback for MIMO-OFDM Systems over Frequency Selective Channels", Vehicular Technology Conference, 2005, VTC 2005-Spring. 2005 IEEE 61st, Jun. 2005, vol. 1.
Donglai et al., "An Improved Codebook Design for Precoding in MIMO System", Wireless Communications, Networking and Mobile Computing, 2008. WiCOM '08. 4th International Conference, Oct. 2008.
"IEEE Standard for Local and metropolitan area networks, Part 16: Air Interface for Bradband Wireless Access Systems," IEEE Computer Society and the IEEE Microwave Therory and Techniques Society, IEEE Std 802.16 2009, May 26, 2009, New York, New York.
Extended European Search Report issued Jan. 17, 2017 from European Patent Application No. 10797665.6, 9 pages.
Extended European Search Report issued Feb. 1, 2017 from European Divisional Application No. 16191444.5, 9 pages.
IEEE, "Part 16: Air Interface for Fixed and Mobile Broadband Wireless Access Systems," 802.16-09/0010r1a (working document) Mar. 2008, Advanced Air Interface (working document), 351 pages.
Li et al., "Codebook design for IEEE 802.16m MIMO Schemes," IEEE 802.16 Broadband Wireless Access Working Group, Sep. 12, 2008, IEEE C802.16m_MIMO-08_1182r3, 14 pages.

* cited by examiner

BEAMFORMING USING BASE AND DIFFERENTIAL CODEBOOKS

CROSS REFERENCE TO RELATED APPLICATIONS

The present application is a continuation of U.S. patent application Ser. No. 14/593,957, filed Jan. 9, 2015, entitled, "BEAMFORMING USING BASE AND DIFFERENTIAL CODEBOOKS," which is a continuation of U.S. patent application Ser. No. 13/652,061, filed Oct. 15, 2012, entitled, "BEAMFORMING USING BASE AND DIFFERENTIAL CODEBOOKS," which is a continuation of U.S. patent application Ser. No. 12/639,640 filed Dec. 16, 2009, entitled, "Beamforming Using Base And Differential Codebooks," which claims priority to U.S. Provisional Patent Application No. 61/223,360 filed Jul. 6, 2009, entitled, "Advanced Wireless Communication Systems and Techniques," the entire specifications of which are hereby incorporated by reference in their entireties for all purposes, except for those sections, if any, that are inconsistent with this specification.

TECHNICAL FIELD

Embodiments of the present disclosure relate generally to wireless communication systems, and more particularly, to methods and apparatuses for beamforming using a base codebook and a differential codebook.

BACKGROUND

A mobile station in a closed-loop multi input and/or multi output (MIMO) system generally transmits channel state information to a base station over a feedback path. The channel state information is used to employ beamforming at the base station, to compensate for the current channel conditions. In some of the conventional systems, the mobile station transmits a channel covariance matrix to the base station, from which the base station determines a beamforming matrix that is used to employ beamforming at the base station. In some other conventional systems, a beamforming matrix is generated at the mobile station based on the channel conditions. The generated beamforming matrix is then provided to the base station as feedback. However, transmitting the channel covariance matrix and/or the beamforming matrix from the mobile station to the base station may consume relatively high bandwidth that might otherwise be available for data traffic.

BRIEF DESCRIPTION OF THE DRAWINGS

Embodiments of the invention will be described by way of exemplary embodiments, but not limitations, illustrated in the accompanying drawings in which like references denote similar elements, and in which.

DETAILED DESCRIPTION

Figure 1:
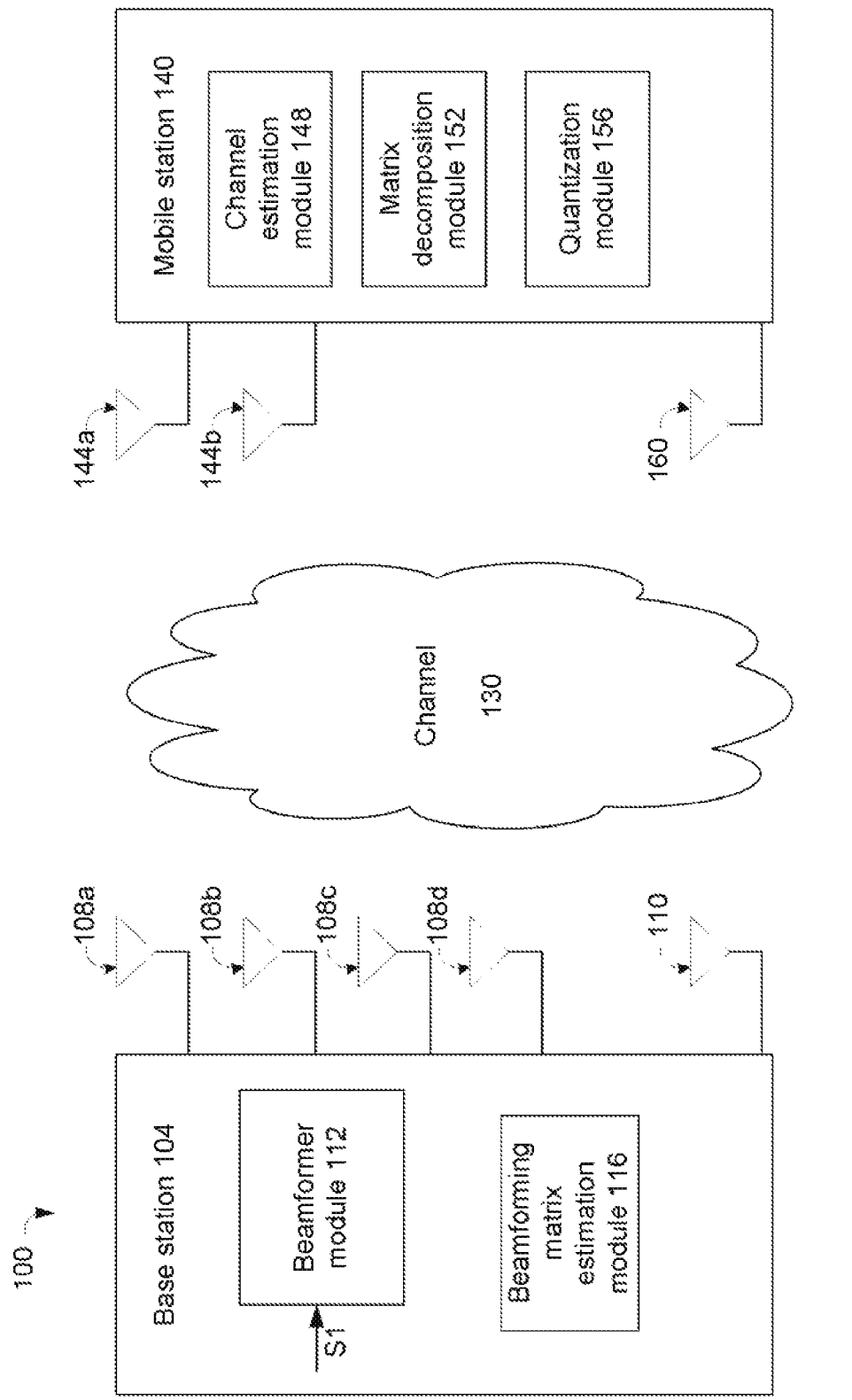
FIG. 1 schematically illustrates a MIMO system.

Illustrative embodiments of the invention include, but are not limited to, methods and apparatuses for generating and/or estimating a beamforming matrix using a base codebook and a differential codebook.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the invention. This application is intended to cover any adaptations or variations of the embodiments discussed herein. Therefore, it is manifestly intended that the embodiments of the invention be limited only by the claims and the equivalents thereof.

For the purpose of this disclosure and unless otherwise mentioned, a conjugate transpose of an m by n matrix A with possibly complex entries is an n by m matrix, represented by A*, obtained by taking the transpose of the matrix A, and then taking the complex conjugate of each entry of the matrix formed by taking the transpose of the matrix A. For the purpose of this disclosure and unless otherwise mentioned, a unitary matrix is an n by n complex matrix B satisfying the condition $(B^*)B = B(B^*) = I_n$, where $I_n$ is the identity matrix in n dimensions, and B* is the conjugate transpose of B. Thus, a matrix B is unitary if and only if B has an inverse, wherein the inverse of B is equal to the conjugate transpose of B. For the purpose of this disclosure and unless otherwise mentioned, two vectors are orthogonal if the two vectors are perpendicular to each other (e.g., the two vectors form a right angle, the dot product of the two vectors is 0). For the purpose of this disclosure and unless otherwise mentioned, a hermitian matrix C is a square matrix with possible complex entries, each of which is equal to its own conjugate transpose (e.g., the element in the $i^{th}$ row and $j^{th}$ column of matrix C is equal to the complex conjugate of the element in the $j^{th}$ row and $i^{th}$ column of matrix C, for all indices i and j). Thus, if a matrix C is a hermitian matrix, then C*=C. For the purpose of this disclosure and unless otherwise mentioned, for an m by n matrix M, a singular value decomposition of matrix M refers to a factorization of the form M=E Λ F*, where E is an m by m unitary matrix, Λ0 is a m by n diagonal matrix with nonnegative real numbers on its diagonal, and F* denotes the conjugate transpose of matrix F, where matrix F is an n by n unitary matrix.

Embodiments of the present disclosure may be used in wireless access networks that employ orthogonal frequency division multiple access (OFDMA) communications as used by multicarrier transmission schemes presented in, e.g., the Institute of Electrical and Electronics Engineers (IEEE) 802.16-2009, approved May 13, 2009, along with any amendments, updates, and/or revisions (e.g., 802.16m, which is presently at predraft stage), 3rd Generation Partnership Project (3GPP) long-term evolution (LTE) project, ultra mobile broadband (UMB) project (also referred to as "3GPP2"), etc. In other embodiments, communications may be compatible with additional/alternative communication standards and/or specifications.

FIG. 1 schematically illustrates a communication system 100, in accordance with various embodiments of the present disclosure. In various embodiments, the communication system 100 includes a base station 104 that communicates with a mobile station 140 over wireless channel 130. In various embodiments, the base station 104 and/or the mobile station 140 may be MIMO devices. In various embodiments, the communication system 100 may be a closed-loop system that employs beamforming to increase a signal to noise ratio (SNR) of signals transmitted by base station 104 to mobile station 140.

In various embodiments, the base station 104 may transmit one or more data streams to the mobile station 140. For example, FIG. 1 illustrates a data stream S1 being transmitted by the base station 104 to the mobile station 140, although in various other embodiments, any other suitable number of data streams may also be provided. Prior to transmission, the data stream S1 may be appropriately weighted by one or more components of the base station 104 as discussed hereinafter.

In various embodiments, the base station 104 may include a beamformer module 112 to weight data signals (e.g., data signals of data stream S1) by a beamforming matrix. The term beamforming is used herein to describe the application of beamforming coefficients or weights to frequency-domain signals in the data stream(s), prior to transmission. In various embodiments, the beamforming coefficients or weights may be determined from the beamforming matrix.

Base station 104 may comprise a plurality of transmit antennas 108a, 108b, 108c and 108d, to transmit the weighted data stream. In FIG. 1, four transmit antennas are illustrated, although in various other embodiments, any other suitable number of transmit antennas may be included in the base station 104.

The base station 104 may also include one or more receive antennas (e.g., receive antenna 110) that may receive, among other information, feedback about the channel condition from the mobile station 140.

In various embodiments, the base station 104 may also include a beamforming matrix estimation module 116, which may be configured to estimate the beamforming matrix, based at least in part on feedback received from the mobile station 140.

An order (e.g., number of rows and/or columns) of the beamforming matrix may be based on a number of data stream(s) transmitted by the base station 104 and a number of transmit antennas included in the base station 104. In various embodiments, the beamforming matrix may be of order $N_t$ by $N_s$, where $N_t$ and $N_s$ are the number of transmit antennas and the number of data stream(s), respectively, of the base station 104. For example, in FIG. 1, $N_t$ is 4 (as there are four transmit antennas 108a, 108b, 108c and 108d) and $N_s$ is 1 (as there is one data stream S1), and hence, a beamforming matrix B is a 4 by 1 vector. In various embodiments, the signal transmitted by the base station 104 may be represented by $$x = B \cdot S,$$ Equation (1)

where S represents $N_s$ data stream(s) (e.g., data stream S1 of FIG. 1) of the base station 104, B is the $N_t$ by $N_s$ beamforming matrix determined by the beamforming matrix estimation module 116, and x is an $N_t$ by 1 vector corresponding to the weighted data signals transmitted by the four transmit antennas 108a, 108b, 108c and 108d.

In various embodiments, the base station 104 may include at least as many transmit antennas as the number of data stream(s) being transmitted by base station 104, although the scope of this disclosure may not be limited in this respect. In these embodiments, $N_t$ is at least as high as $N_s$.

Referring again to FIG. 1, in various embodiments, the mobile station 140 may include one or more receive antennas, e.g., receive antennas 144a and 144b, configured to receive signals transmitted through channel 130 by the base station 104. In FIG. 1, two receive antennas are illustrated, although in various other embodiments, any other suitable number of receive antennas may be used. In various embodiments, the mobile station 140 may include at least as many receive antennas as the number of data stream(s) being transmitted by base station 104, although the scope of this disclosure may not be limited in this respect.

In various embodiments, the mobile station 140 may also include a channel estimation module 148 to estimate channel conditions of the channel 130, based at least in part on signals received from one or more of the transmit antennas 108a, . . . , 108d. For example, the channel estimation module 148 may determine a channel matrix H which describes the current state of channel 130. In various embodiments, the channel matrix H may be indicative of conditions of sub-channels between each of the transmit antennas 108a, . . . , 108d and each of the receive antennas 144a and 144b. In various embodiments, the channel matrix H may be of the order $N_r$ by $N_t$, where $N_r$ may be a number of receive antennas in the mobile station 140. FIG. 1 illustrates four transmit antennas 108a, . . . , 108d (i.e., $N_t=4$) of the base station 104 and two receive antennas 144a and 144b (i.e., $N_r=2$) of the mobile station 140, and accordingly, the channel matrix H may be a 2 by 4 matrix for the MIMO system 100.

The channel estimation module 148 may also construct a channel covariance matrix R from the channel matrix H. For example, the channel covariance matrix R may be equal to $$R = E[(H^*)H],$$ Equation (2)

wherein H* is the conjugate transpose of the channel matrix H, and E[ ] is an expectation operation. In various embodiments, the channel matrix H may be representative of an instantaneous condition of the channel 130, whereas the channel covariance matrix R may be representative of relatively long-term statistics of the channel 130. Thus, the channel matrix H may change faster over time and frequency as compared to the channel covariance matrix R. In various embodiments, the channel covariance matrix R may be a Hermitian matrix of order $N_t$ by $N_t$, where $N_t$ (e.g., the number of transmit antennas of the base station 104) is 4 for the MIMO system 100.

In various embodiments, the mobile station 140 may also include a matrix decomposition module 152 configured to decompose the channel covariance matrix R using, for example, singular value decomposition. Singular value decomposition of a matrix refers to factorizing the matrix in three different matrices. For example, the singular value decomposition of the channel covariance matrix R may be of the form:

$$R = U \Lambda V^*, \quad \text{Equation (3)}$$

where U is an unitary square matrix of order $N_t$, $\Lambda$ is a $N_t$ by $N_t$ diagonal matrix with nonnegative real numbers on its diagonal, and $V^*$ is the conjugate transpose of an unitary square matrix V of order $N_t$. In various embodiments, the columns of matrix V may be the eigenvectors of matrix $(R^*)R$, and the diagonal values in matrix $\Lambda$ may be the singular values of R.

In various embodiments, the matrix V may include the beamforming matrix, and the part of the matrix V that represents the beamforming matrix may be represented by $V_b$. For example, as previously discussed, for a single data stream (e.g., $N_s=1$) and four transmit antennas (e.g., $N_t=4$) of the base station 104 (e.g., as illustrated in FIG. 1), the beamforming matrix is a 4 by 1 vector. In this case, the matrix V is a 4 by 4 square matrix, and the first column of V (e.g., the principal eigenvector of matrix $(R^*)R$) may form the beamforming matrix $V_b$. That is, in this case, the beamforming matrix $V_b$ may consist of the first column of the matrix V.

In another example (not illustrated in FIG. 1), for two data streams (e.g., $N_s=2$) and four transmit antennas (e.g., $N_t=4$) of the base station 104, the matrix V is a 4 by 4 square matrix and the beamforming matrix $V_b$ is a 4 by 2 matrix. In this case, the first two columns of V (e.g., two eigenvectors of matrix $(R^*)R$) may form the beamforming matrix $V_b$.

In various embodiments, the mobile station 140 may also include a quantization module 156. Once the beamforming matrix $V_b$ is generated from the matrix V, the quantization module 156 may quantize the beamforming matrix $V_b$ using a base codebook $C_b$. In these embodiments, the base codebook $C_b$ may be used to populate the surface of a manifold to efficiently encode or quantize the beamforming matrix. The base codebook $C_b$ may include a plurality of candidate matrices, each having dimensions similar to the beamforming matrix $V_b$. A candidate matrix, among the plurality of candidate matrices, that best matches the beamforming matrix $V_b$ may be selected from the base codebook $C_b$, and a codeword corresponding to the selected candidate matrix may be feedback by the mobile station 140 to the base station 104. Here, the selected candidate matrix may be representative of the beamforming matrix $V_b$ (e.g., the selected candidate matrix may be a quantized version of the beamforming matrix $V_b$), and the selected candidate matrix may be referred herein as quantized beamforming matrix.

For example, referring again to FIG. 1, the quantization module 156 may quantize the beamforming matrix $V_b$ as follows:

$$\hat{V} = \underset{V_i \in C_b}{\operatorname{argmax}} \| V_b^* V_i \|_F, \quad \text{Equation (4)}$$

where V is the quantized beamforming matrix, $C_b$ is the base codebook, Vi represents the candidate matrices in the base codebook $C_b$, $V_b^*$ is a complex conjugate of the beamforming matrix $V_b$, and $\| \|_F$ is the Frobenius-norm operation. Although Frobenius-norm is used in equation 4, in various other embodiments, any other appropriate matrix norm or vector norm (e.g., the spectral norm, the Euclidean norm, or the like) may also be used. Equation 4 selects, from among the plurality of candidate matrices included in the base codebook $C_b$, the quantized beamforming matrix V that is best representative of the beamforming matrix $V_b$.

In various embodiments, although quantized beamforming matrix $\hat{V}$ is representative of the beamforming matrix $V_b$, there may be possible quantization error (e.g., difference between the quantized beamforming matrix $\hat{V}$ and the beamforming matrix $V_b$) when the quantized beamforming matrix $\hat{V}$ is selected from the base codebook $C_b$. The quantization error may be based on several factors including, but not limited to, a number of candidate matrices included in the base codebook $C_b$ and how closely the beamforming matrix $V_b$ matches the selected candidate matrix (e.g., the quantized beamforming matrix $\hat{V}$) from the base codebook $C_b$.

In various embodiments, to reduce this quantization error, the mobile station 140 may determine a difference matrix that is representative of a difference between the beamforming matrix $V_b$ and the quantized beamforming matrix $\hat{V}$. For example, a difference matrix D may be formed such that $$D = [\hat{V} \ \hat{V}^{\perp}]^* V_b, \quad \text{Equation (5)}$$

wherein $[\hat{V} \ \hat{V}^{\perp}]^*$ is the conjugate transpose of $N_t$ by $N_t$ matrix $[\hat{V} \ \hat{V}^{\perp}]$. Also, $\hat{V}^{\perp}$ may be a matrix that includes columns that are orthogonal to the columns of the quantized beamforming matrix $\hat{V}$, and the order of the matrix $\hat{V}^{\perp}$ may be $N_t$ by $(N_t-N_s)$. For example, for $N_s=1$ and $N_t=4$, $\hat{V}$ is a 4 by 1 vector, and $\hat{V}^{\perp}$ may be a 4 by 3 matrix that is selected such that each of the columns of $\hat{V}^{\perp}$ are orthogonal to the vector $\hat{V}$. In another example, for $N_s=2$ and $N_t=4$, $\hat{V}$ is a 4 by 2 matrix, and $\hat{V}^{\perp}$ may be a 4 by 2 matrix that is selected such that each of the columns of $\hat{V}^{\perp}$ are orthogonal to each of the columns of the matrix $\hat{V}$. In various embodiments, $\hat{V}^{\perp}$ may be selected such that $[\hat{V} \ \hat{V}^{\perp}]$ is a unitary matrix. In various embodiments, the difference matrix D and/or the matrix $\hat{V}^{\perp}$ may be calculated by, for example, a householder reflection operation on the quantized beamforming matrix $\hat{V}$. The difference matrix D may be representative of the difference between the beamforming matrix $V_b$ and the matrix $\hat{V}$.

In various embodiments, the difference matrix D may be quantized using a differential codebook $C_d$. The differential codebook $C_d$ may include a plurality of candidate matrices, each having dimensions similar to the difference matrix D. For example, referring again to FIG. 1, the quantization module 156 may quantize the difference matrix D as follows:

$$\hat{D} = \underset{D_i \in C_d}{\operatorname{argmax}} \| D^* D_i \|_F, \quad \text{Equation (6)}$$

where the quantized difference matrix $\hat{D}$ is a quantization of the difference matrix D, $C_d$ is the differential codebook, Di represents the candidate matrices in the differential codebook $C_d$, and $\| \|_F$ is the Frobenius-norm operation. Although Frobenius-norm is used in equation 6, in various other embodiments, any other appropriate matrix norm or vector norm may also be used. Equation 6 selects, from the differential codebook $C_d$, a candidate matrix $\hat{D}$ that is best representative of the difference matrix D.

In various embodiments, the mobile station 140 may transmit, by way of the transmit antenna 160, a first codeword and a second codeword to the base station 104. In various embodiments, the first codeword (e.g., from the base codebook $C_b$) may be associated with the quantized beamforming matrix $\hat{V}$ and the second codeword (e.g., from the differential codebook $C_d$) may be associated with the quantized difference matrix $\hat{D}$. The mobile station 140 may transmit the first codeword and the second codeword to the base station 104 (e.g., instead of sending the actual matrices $\hat{V}$ and $\hat{D}$), to enable the base station 104 to estimate the beamforming matrix $V_b$ from the transmitted first and second codewords.

For example, if the quantized beamforming matrix $\hat{V}$ is an $n^{th}$ matrix of the plurality of candidate matrices in the base codebook $C_b$, and if the quantized difference matrix $\hat{D}$ is a $m^{th}$ matrix of the plurality of the candidate matrices in the differential codebook $C_d$, then the numbers n and m may be the first and second codewords, respectively. In various other embodiments, codewords associated with the quantized beamforming matrix $\hat{V}$ and/or the quantized difference matrix $\hat{D}$ may be formed in any other appropriate manner as well.

In various embodiments, once the base station 104 receives the first and second codewords from the mobile station 140, the base station 104 may determine, from the received first and second codewords, the matrices $\hat{D}$ and $\hat{V}$, respectively, using saved copies of the base codebook $C_b$ and differential codebook $C_d$. In various other embodiments, the base station 104 may determine, from the received codewords, the matrices $\hat{D}$ and $\hat{V}$ in any other appropriate manner as well.

Once the base station 104 determines the matrices $\hat{D}$ and $\hat{V}$, the beamforming matrix estimation module 116 in the base station 104 may estimate the original beamforming matrix $V_b$. For example, the beamforming matrix estimation module 116 may generate the matrix $\hat{V}^\perp$ from the determined matrix $\hat{V}$. Subsequently, the beamforming matrix estimation module 116 may determine an estimated beamforming matrix $\hat{V}_b$ as follows:

$$\hat{V}_b = [\hat{V}\ \hat{V}^\perp]\hat{D}. \qquad \text{Equation (7)}$$

Thus, the estimated beamforming matrix $\hat{V}_b$ may be an estimate of the original beamforming matrix $V_b$. In various embodiments, the base station 104 (e.g., the beamformer module 112) may weight data stream(s) (e.g., as discussed with respect to equation 1) with the estimated beamforming matrix $\hat{V}_b$, and the transmit antennas 108a, . . . , 108d of the base station 104 may transmit the weighted data stream(s).

Figure 2:
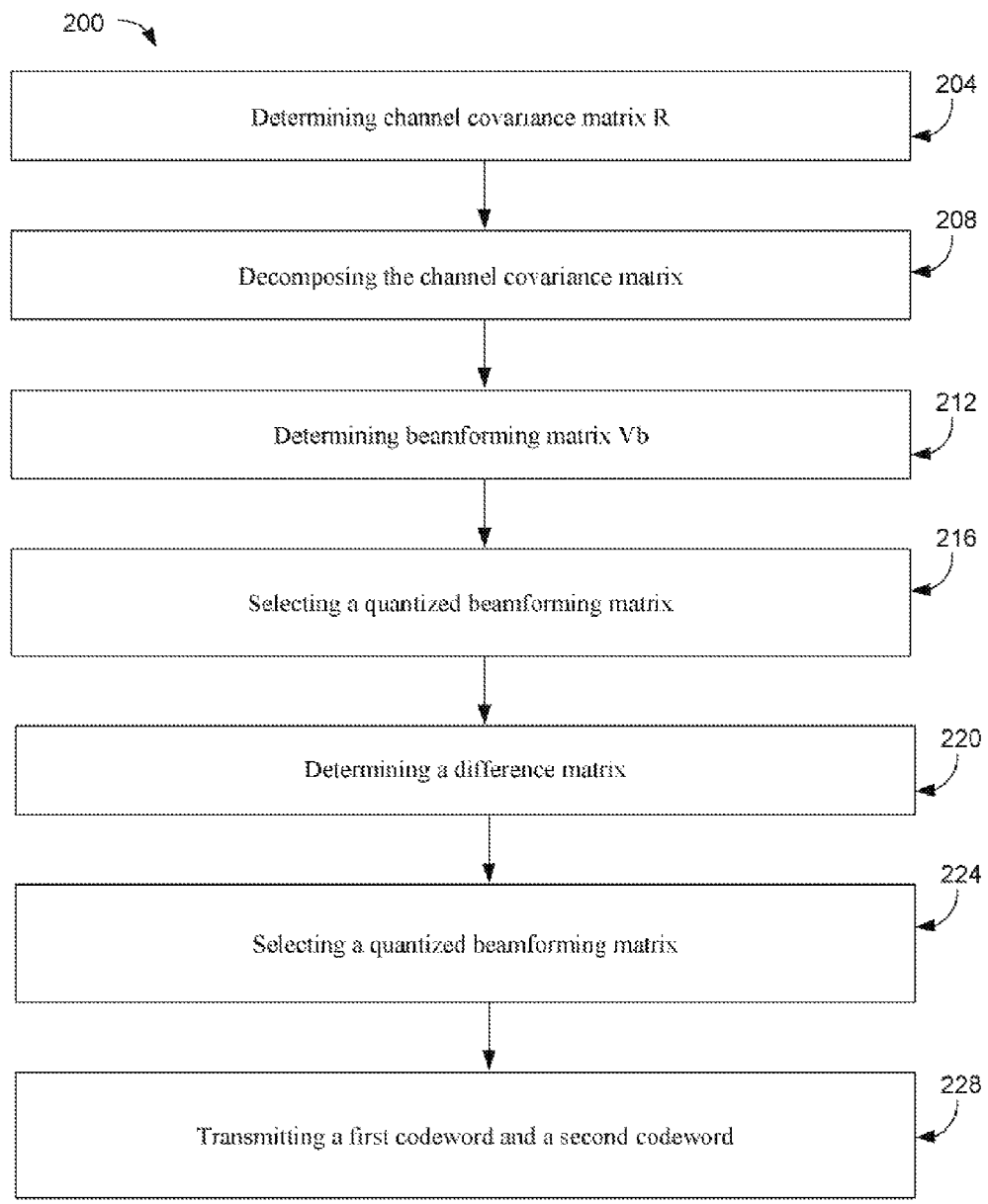
FIG. 2 illustrates an exemplary method for determination and quantization of a beamforming matrix.

FIG. 2 illustrates an exemplary method 200 for determination and quantization of a beamforming matrix, in accordance with various embodiments of the present invention. One or more operations of the method 200 may be carried by one or more modules of the mobile station 140. Referring to FIGS. 1 and 2, in various embodiments, the method 200 includes, at 204 ("Determining a channel covariance matrix R"), determining, e.g., by the channel estimation module 148 of the mobile station 140, a channel covariance matrix R based on signals received from the base station 104. In various embodiments, the channel covariance matrix R may be formed from the channel matrix H, as discussed with respect to equation 2. As previously discussed, the channel matrix H may be representative of conditions of sub-channels between one or more transmit antennas 108a, . . . 108d of the base station 104 and one or more receive antennas 144a, 144b of the mobile station 140.

The method 200 may further include, at 208 ("Decomposing the channel covariance matrix"), decomposing, e.g., by the matrix decomposition module 152 of the mobile station 140, the channel covariance matrix R into a left matrix U, a diagonal matrix $\Lambda$, and a complex conjugate of a right matrix V using singular value decomposition, as previously discussed with respect to equation 3.

The method 200 may further include, at 212 ("Determining beamforming matrix Vb"), determining, e.g., by the matrix decomposition module 152 of the mobile station 140, the beamforming matrix $V_b$ such that the beamforming matrix $V_b$ comprises one or more columns of the right matrix V. In various embodiments, the beamforming matrix $V_b$ may comprise the first $N_s$ number of columns of the right matrix V.

The method 200 may further include, at 216 ("Selecting a quantized beamforming matrix"), selecting, e.g., by the quantization module 156 of the mobile station 140, a quantized beamforming matrix $\hat{V}$ from a first plurality of candidate matrices included in base codebook $C_b$, where the quantized beamforming matrix $\hat{V}$ may be representative of the beamforming matrix $V_b$. The quantized beamforming matrix $\hat{V}$ may be selected such that the quantized beamforming matrix $\hat{V}$, among the first plurality of candidate matrices in the base codebook $C_b$, maximizes a Frobenius norm of a product of a complex conjugate of the beamforming matrix and the quantized beamforming matrix $\hat{V}$, as discussed with respect to equation 4.

The method 200 may further include, at 220 ("Determining a difference matrix"), determining, e.g., by the quantization module 156 of the mobile station 140, a difference matrix D that is representative of a difference between the beamforming matrix $V_b$ and the quantized beamforming matrix $\hat{V}$, as discussed with respect to equation 5. For example, to determine the difference matrix D, matrix $\hat{V}^\perp$ may be formed (e.g., using householder reflection on the quantized beamforming matrix $\hat{V}$) based at least in part on the quantized beamforming matrix $\hat{V}$, such that each of one or more columns of the matrix $\hat{V}^\perp$ is orthogonal to each of one or more columns of the quantized beamforming matrix $\hat{V}$. Subsequently, [$\hat{V}\ \hat{V}^\perp$ matrix] may be matrix formed, which may be a combination of the quantized beamforming matrix $\hat{V}$ and the matrix $\hat{V}^\perp$. In various embodiments, the matrix $\hat{V}^\perp$ may be formed such that the matrix [$\hat{V}\ \hat{V}^\perp$] is an unitary matrix having an order that is equal to a number of rows of the beamforming matrix $V_b$. The difference matrix D may be determined such that the difference matrix D is a product of a complex conjugate of the matrix [$\hat{V}\ \hat{V}^\perp$] and the beamforming matrix $V_b$, as discussed with respect to equation 5.

The method 200 may further include, at 224 ("Selecting a quantized beamforming matrix"), selecting, e.g., by the quantization module 156 of the mobile station 140, a quantized difference matrix $\hat{D}$ from a second plurality of candidate matrices included in differential codebook $C_d$, where the quantized difference matrix $\hat{D}$ may be representative of the difference matrix D. The quantized difference matrix $\hat{D}$ may be selected such that the quantized difference matrix $\hat{D}$, among all the second plurality of candidate matrices in the difference codebook $C_d$, maximizes a Frobenius norm of a product of a complex conjugate of the difference matrix and the quantized difference matrix $\hat{D}$, as discussed with respect to equation 6.

The method 200 may further include, at 228 ("Transmitting a first codeword and a second codeword"), transmitting, e.g., by the transmit antenna 160 of the mobile station 140, to the base station 104, a first codeword and a second codeword associated with the quantized beamforming matrix and the quantized difference matrix, respectively, as previously discussed.

Figure 3:
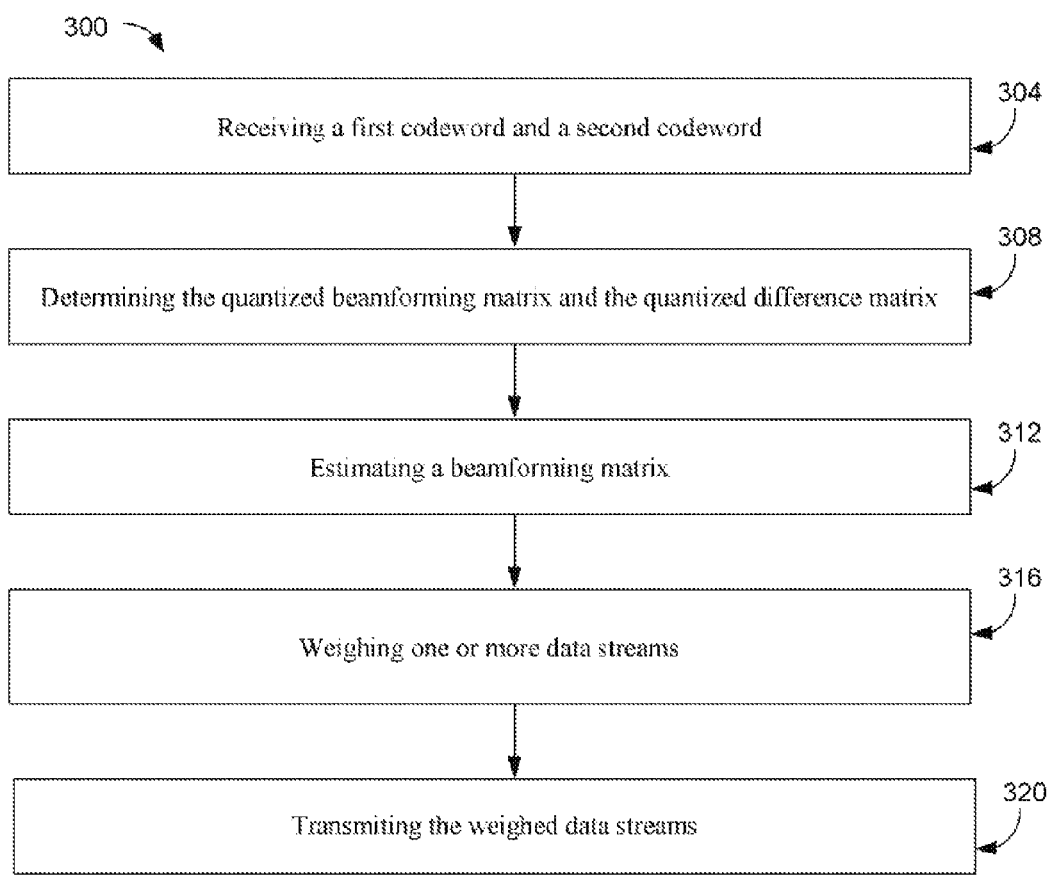
FIG. 3 illustrates an exemplary method for estimating a beamforming matrix based on feedback received from a mobile station.

FIG. 3 illustrates an exemplary method 300 for estimating, by base station 104, the beamforming matrix based on feedback received from the mobile station 140, in accordance with various embodiments of the present invention. One or more operations of the method 300 may be carried by one or more modules of the base station 104. Referring to FIGS. 1 and 3, in various embodiments, the method 300 includes, at 304 ("Receiving a first codeword and a second codeword"), receiving, e.g., by the receive antenna 110, from the mobile station 140, e.g., from the transmit antenna 160, a first codeword and a second codeword associated with the quantized beamforming matrix $\hat{V}$ and the quantized difference matrix $\hat{D}$, respectively.

The method 300 may further include, at 308 ("Determining the quantized beamforming matrix and the quantized difference matrix"), determining, e.g., by the beamforming matrix estimation module 116, the quantized beamforming matrix $\hat{V}$ and the quantized difference matrix $\hat{D}$ based at least in part on the received first codeword and the second codeword, respectively.

The method 300 may further include, at 312 ("Estimating a beamforming matrix"), estimating, e.g., by the beamforming matrix estimation module 116, the beamforming matrix (e.g., the estimated beamforming matrix $\hat{V}_b$) from the determined quantized beamforming matrix $\hat{V}$ and the quantized difference matrix $\hat{D}$, as discussed with respect to equation 7.

The method 300 may further include, at 316 ("Weighing one or more data streams"), weighing, e.g., by the beamformer module 112, one or more data streams (e.g., data stream S1) using the estimated beamforming matrix $\hat{V}_b$. The method 300 may further include, at 320 ("Transmitting the weighed data streams"), transmitting, e.g. by one or more transmit antennas (e.g., transmit antennas $108a, \ldots, 108d$) of the base station 104, the weighed data stream(s) to the mobile station 140.

Quantizing the beamforming matrix using two codebooks $C_b$ and $C_d$ has several advantages relative to quantizing a beamforming matrix using a single codebook. For example, quantizing the beamforming matrix into the quantized beamforming matrix $\hat{V}$ and the quantized difference matrix $\hat{D}$ may reduce a quantization error. Accordingly, the estimation of the beamforming matrix, formed at the base station 104, may be more accurate.

In various embodiments discussed so far, a base codebook and a differential codebook is used to quantize the beamforming matrix. However, in various embodiments, more than one differential codebook may also be used. For example, once the difference matrix D and the quantized difference matrix $\hat{D}$ are generated, a second difference matrix may be generated (e.g., using an equation that is at least in part similar to equation 5), which may be representative of a difference between the difference matrix D and the quantized difference matrix $\hat{D}$. The second difference matrix may then be quantized using a second differential codebook to generate a second quantized difference matrix. The mobile station 140 may transmit, to the base station 104, a codeword corresponding to the second quantized difference matrix, in addition to transmitting codewords corresponding to the quantized beamforming matrix and the quantized difference matrix. The base station 104 may estimate the beamforming matrix $\hat{V}_b$ using codewords corresponding to the quantized beamforming matrix, the quantized difference matrix, and the second quantized difference matrix.

In the embodiments discussed so far, quantized form of the beamforming matrix (which includes the quantized beamforming matrix $\hat{V}$ and the quantized difference matrix $\hat{D}$) is transmitted by the mobile station 140 to the base station 104. In various embodiments, the mobile station 140 may also transmit a quantized form of the channel covariance matrix R (e.g., instead of or in addition to transmitting the quantized form of the beamforming matrix) to the base station 104, to enable the base station 104 to reconstruct or estimate the channel covariance matrix and subsequently determine the beamforming matrix by decomposing the estimated channel covariance matrix. For example, the mobile station 140 may quantize the channel covariance matrix R (e.g., obtained from equation 2) using a base codebook (using a method that is at least in part similar to equation 4) to obtain a quantized channel covariance matrix. The mobile station 140 may then calculate a corresponding difference matrix (using a method that is at least in part similar to equation 5) that is representative of a difference between the channel covariance matrix and the quantized channel covariance matrix. The mobile station 140 may quantize the corresponding difference matrix using a differential codebook (using a method that is at least in part similar to equation 6) to obtain a corresponding quantized difference matrix. The mobile station 140 may transmit codewords corresponding to the generated quantized matrices to the base station 104, from which the base station 104 may estimate the channel covariance matrix. The base station 104 may then estimate the beamforming matrix by decomposing (e.g., using singular value decomposition) the estimated channel covariance matrix.

Figure 4:
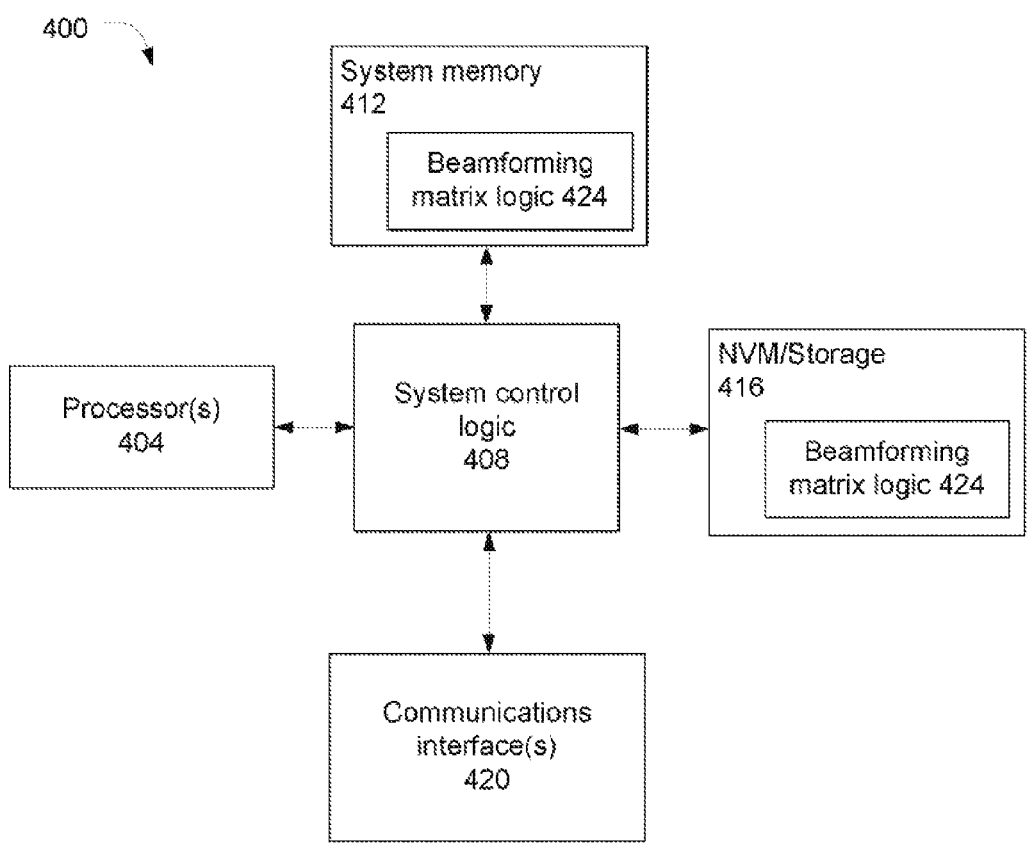
FIG. 4 illustrates an example system capable of implementing a communication device, all in accordance with various embodiments of the present disclosure.

The communication devices described herein may be implemented into a system using any suitable hardware and/or software to configure as desired. FIG. 4 illustrates, for one embodiment, an example system 400 comprising one or more processor(s) 404, system control logic 408 coupled to at least one of the processor(s) 404, system memory 412 coupled to system control logic 408, non-volatile memory (NVM)/storage 416 coupled to system control logic 408, and one or more communications interface(s) 420 coupled to system control logic 408.

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory (DRAM), for example.

System control logic 408 for one embodiment may include one or more input/output (I/O) controller(s) to provide an interface to NVM/storage 416 and communications interface(s) 420.

NVM/storage 416 may be used to store data and/or instructions, for example. NVM/storage 416 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s) for example.

The NVM/storage 416 may include a storage resource physically part of a device on which the system 400 is installed or it may be accessible by, but not necessarily a part of, the device. For example, the NVM/storage 416 may be accessed over a network via the communications interface(s) 420.

System memory 412 and NVM/storage 416 may include, in particular, temporal and persistent copies of beamforming matrix logic 424, respectively. In various embodiments, the system 400 may be a part of the mobile station 140, and the beamforming matrix logic 424 may include instructions that when executed by at least one of the processor(s) 404 result in the system 400 generating a beamforming matrix and/or quantizing the beamforming matrix (e.g., using a base codebook and a differential codebook), as described herein. In various other embodiments, the system 400 may be a part of the base station 104, and the beamforming matrix logic 424 may include instructions that when executed by at least one of the processor(s) 404 result in the system 400 estimating a beamforming matrix from received codewords (e.g., corewords corresponding to the beamforming matrix) of the base codebook and the differential codebook, as described herein.

In some embodiments, the beamforming matrix logic 424 may additionally (or alternatively) be located in the system control logic 408.

Communications interface(s) 420 may provide an interface for system 400 to communicate over one or more network(s) and/or with any other suitable device. Communications interface(s) 420 may include any suitable hardware and/or firmware. Communications interface(s) 420 for one embodiment may include, for example, a network adapter, a wireless network adapter, a telephone modem, and/or a wireless modem. For wireless communications, communications interface(s) 420 for one embodiment may use one or more antennae.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

In various embodiments, system 400 may have more or less components, and/or different architectures.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. One or more non-transitory, computer-readable media having instructions that, when executed by one or more processors, cause a base station to:
   determine a first beamforming matrix component based on a first codebook index fed back from a mobile station;
   determine a second beamforming matrix component based on a second codebook index fed back from the mobile station, the second codebook index to reduce a quantization error with respect to the first codebook index;
   determine a beamforming matrix based on the first and second beamforming matrix components; and
   form a beam, based on the beamforming matrix, to transmit data to the mobile station in one or more streams.

2. The one or more non-transitory, computer-readable media of claim 1, wherein the instructions, when executed, further cause the base station to:
   apply beamforming coefficients to frequency-domain signals in the one or more streams based on the determined beamforming matrix.

3. The one or more computer-readable media of claim 1, wherein the instructions, when executed, further cause the base station to:
   transmit the one or more streams by a plurality of antennas of the base station.

4. The one or more computer-readable media of claim 3, wherein the beamforming matrix includes a plurality of rows that respectively correspond with the plurality of antennas.

5. The one or more computer-readable media of claim 1, wherein the base station is to receive a first codeword to indicate the first codebook index and a second codeword to indicate the second codebook index.

6. An apparatus comprising:
   first circuitry to:
     determine a first beamforming matrix component based on a first codebook index fed back from a mobile station;
     determine a second beamforming matrix component based on a second codebook index fed back from the mobile station, the second codebook index to reduce a quantization error with respect to the first codebook index;
     determine a beamforming matrix based on the first and second beamforming matrix components; and
   second circuitry to:
     weight signals of a data stream to be transmitted to the mobile station based on the beamforming matrix.

7. The apparatus of claim 6, further comprising: four or more antennas to transmit the weighted signals.

8. The apparatus of claim 7, wherein the beamforming matrix includes four or more rows that respectively correspond with the four or more antennas.

9. The apparatus of claim 6, wherein the first and second circuitry are programmable.

10. The apparatus of claim 6, wherein the apparatus comprises a wireless modem.

11. The apparatus of claim 6, wherein the apparatus is a base station comprising a communication interface that includes the first circuitry and the second circuitry.

12. An apparatus comprising:
    means for determining a first beamforming matrix component based on a first codebook index fed back from a mobile station;
    means for determining a second beamforming matrix component based on a second codebook index fed back from the mobile station, the second codebook index to reduce a quantization error with respect to the first codebook index;

means for determining a beamforming matrix based on the first and second beamforming matrix components;

means for weighting data signals based on the beamforming matrix; and means for transmitting the weighted data signals.

13. The apparatus of claim 12, wherein said means for transmitting the weighted data signals includes means for transmitting the weighted data signals by four or more antennas.

14. The apparatus of claim 12, wherein means for weighting the data signals comprises:

means for applying beamforming coefficients to frequency-domain signals in one or more streams.

15. One or more non-transitory, computer-readable media having instructions that, when executed by one or more processors, cause a mobile station to:

determine, based on channel conditions, a desired beamforming matrix to be used, by a base station, to transmit data to the mobile station in one or more streams;

determine first and second codebook indices that correspond to first and second beamforming matrix components to be used to identify the desired beamforming matrix, the second codebook index determined to reduce a quantization error with respect to the first codebook index; and transmit indications of the first and second codebook indices to the base station.

16. The one or more non-transitory, computer-readable media of claim 15, wherein the first codebook index is associated with a first quantization error, the second codebook index is associated with a second quantization error, and the second quantization error is less than the first quantization error.

17. The one or more non-transitory, computer-readable media of claim 15, wherein the desired beamforming matrix includes beamforming coefficients to be applied to frequency-domain signals in one or more streams to be transmitted to the mobile station.

18. The one or more non-transitory, computer-readable media of claim 15, wherein the instructions, when executed, further cause the mobile station to:

process one or more streams received by one or more antennas of the mobile station.

19. The one or more non-transitory, computer-readable media of claim 15, wherein the instructions, when executed, further cause the mobile station to:

determine a channel matrix that represents conditions of a channel between a base station and a mobile station; and determine the desired beamforming matrix based on the channel matrix.

20. An apparatus comprising:

first circuitry to:

determine a desired beamforming matrix for downlink transmissions;

determine first and second codebook indices that correspond to first and second beamforming matrix components to be used to identify the desired beamforming matrix, the second codebook index determined to reduce a quantization error with respect to the first codebook index; and second circuitry to transmit indications of the first and second codebook indices to a base station.

21. The apparatus of claim 20, wherein the first codebook index is associated with a first quantization error, the second codebook index is associated with a second quantization error, and the second quantization error is less than the first quantization error.

22. The apparatus of claim 20, further comprising: a plurality of antennas to receive downlink transmissions weighted based on the desired beamforming matrix.

23. The apparatus of claim 20, further comprising: a system on a chip including the first and second circuitry.

* * * * *